United States Patent [19]

Bennett et al.

[11] Patent Number: 4,787,109

[45] Date of Patent: Nov. 29, 1988

[54] SPORTSMAN MULTIPLE USE TOOL

[76] Inventors: Clarence L. Bennett, P.O. Box 73; Tommy L. Bennett, Rte. 1, Box 14, both of Garfield, Ark. 72732

[21] Appl. No.: 85,478

[22] Filed: Aug. 14, 1987

[51] Int. Cl.$^4$ .............................................. A01K 69/00
[52] U.S. Cl. ........................................ 7/106; 7/125; 17/68; 17/69; 17/70; 81/418
[58] Field of Search ............... 7/106, 125; 81/418, 81/420, 424.5, 426; 17/68, 69, 70

[56] References Cited

U.S. PATENT DOCUMENTS

| | | | |
|---|---|---|---|
| 1,949,452 | 3/1934 | Chadwick | 81/424.5 |
| 3,046,596 | 7/1962 | Young | 17/70 |
| 3,367,703 | 2/1968 | Pittis | 7/106 |
| 4,386,542 | 6/1983 | Verna | 81/424.5 |
| 4,635,319 | 1/1987 | Gast | 17/70 |

FOREIGN PATENT DOCUMENTS 722338  11/1965  Canada .................................. 7/106

*Primary Examiner*—Roscoe V. Parker

[57] ABSTRACT

A sportsman multiple use tool is a device for allowing the sportsman a variety of tools in one. It comprises a locking bill with teeth for grasping, serrated sides on the bill for scraping, a crimper which is designed within the spacers which keep the teeth from breaking and a groove in the front of the bill for use as a degouger. A device as such will allow the sportsman to use the tool, in camping for securing items and handling hot pots, coals, etc., in hunting for grasping hides when skinning or tanning, in fishing as an all around tool for grasping fish, crabs, turtles, etc., degouging hooks, crimping weights on fishing line, and scraping fish scales off fish.

5 Claims, 2 Drawing Sheets

SPORTSMAN MULTIPLE USE TOOL

BACKGROUND OF THE INVENTION

Field of the Invention

The invention relates generally to a device which will be effective in scraping, crimping, degouging and or grasping, with a lockable grip, a variety of substances when hunting, camping or fishing.

SUMMARY OF THE INVENTION

It is the object of the invention to provide the sportsman with a tool which, because of its gripping ability, can be used as an improved fish handler, a camping tool for securing lines or lifting hot pots, or as an hunting tool for use in skinning, tanning, or securing a variety of materials.

It is another object of the invention to provide an inexpensive multiple use tool in which a sportsman can scrape, crimp, grasp or degouge objects without the need to change tools.

These and other objects and features of the invention will be better understood from the detailed description, reference being taken to the accompanying drawings.

DESCRIPTION OF THE PREFERRED EMBODIMENT

Referring to FIGS. 1, 2, 3 and 4 an embodiment of the sportsman multiple use tool is shown.

Figure 1:
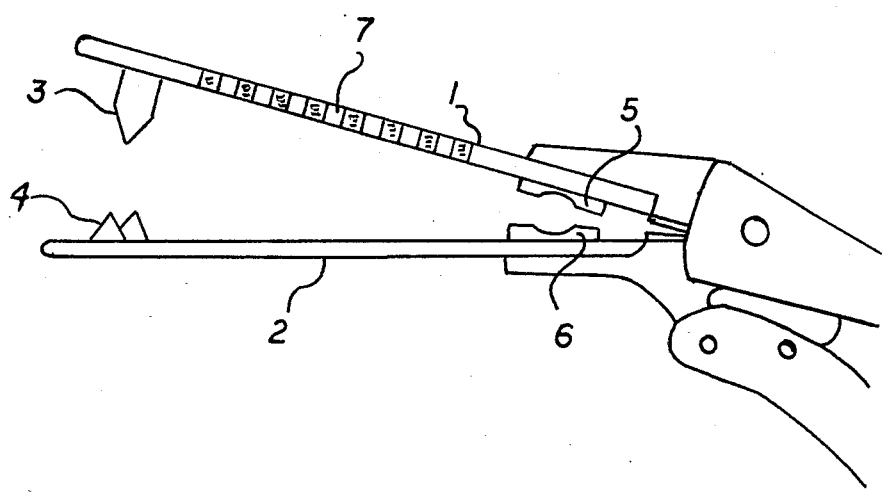
FIG. 1 is a left side perspective view of the multiple use sportsman tool according to the invention.

Referring now more particularly to the drawing, in FIG. 1 the bill is formed of two parts, the upper bill, part 1, and the lower bill, part 2, and is made of a material of strength and flexibility, and which is connected to a plier with compound leverage, and that will lock into place allowing for variable amounts of extension, thus the bill can be locked into place regardless of the thickness of the substance being grasped.

As shown in FIG. 1, parts 3 and 4 are teeth, made of a material of strength, tapered toward the center of the teeth, so as to allow for a surface which will either penatrate or grasp securely to surfaces, depending upon the purpose at the time of use. Furthermore, the shape of the teeth will allow for easy removal of the teeth when the grasp is released. It should be further noted that part 3 is longer than part 4, thus allowing for a firm grip which will not allow for shifting once the embodiment is in a gripping position.

As further shown in FIG. 1, parts 5 and 6, located at the back of parts 1 and 2, are designed as spacers which keep parts 3 and 4, the teeth, from meshing together, thus preventing their breakage. Parts 5 and 6 are further incorporated with a groove which is intended for use as a crimping device.

Figure 2:
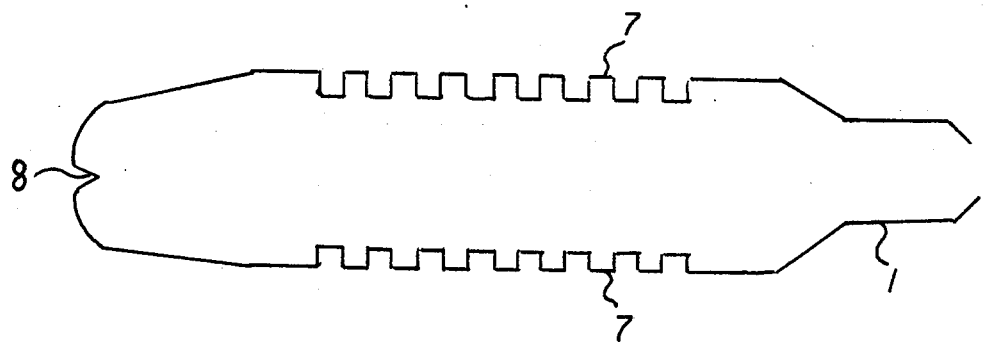
FIG. 2 is a top perspective view of the sportsman multiple use tool.

As shown in FIG. 2, part 7 shows the placement of grooves, which form a serrated edge on part 1, thus allowing the embodiment to be used as a scraper. The grooves of the serrated edge are equally spaced and cut to a depth so as to provide maximum contact with the surface being scraped, without unnecessarily gouging into the surface. Part 8 is a tapered groove on the front of part 1, which is designed to be a degouger of fishing hooks from the mouth or throat of captured prey.

Figure 3:
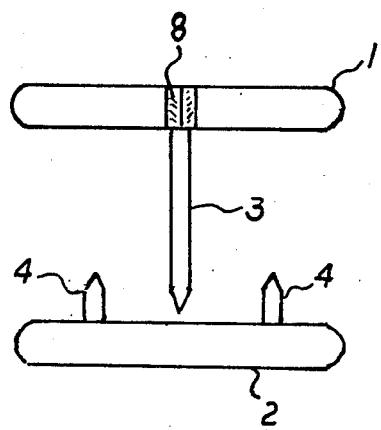
FIG. 3 is a front perspective view of the sportsman multiple use tool.

As shown in FIG. 3, placement of parts 1, 2, 3 and 4 are shown from a front view perspective, thus showing the effectiveness of the gripping feature. FIG. 3, further shows the placement of part 8, the degouger, in relation to the bill's front, part 1, and teeth, parts 3 and 4. Part 8 can be used whether or not the gripping feature is engaged.

Figure 4:
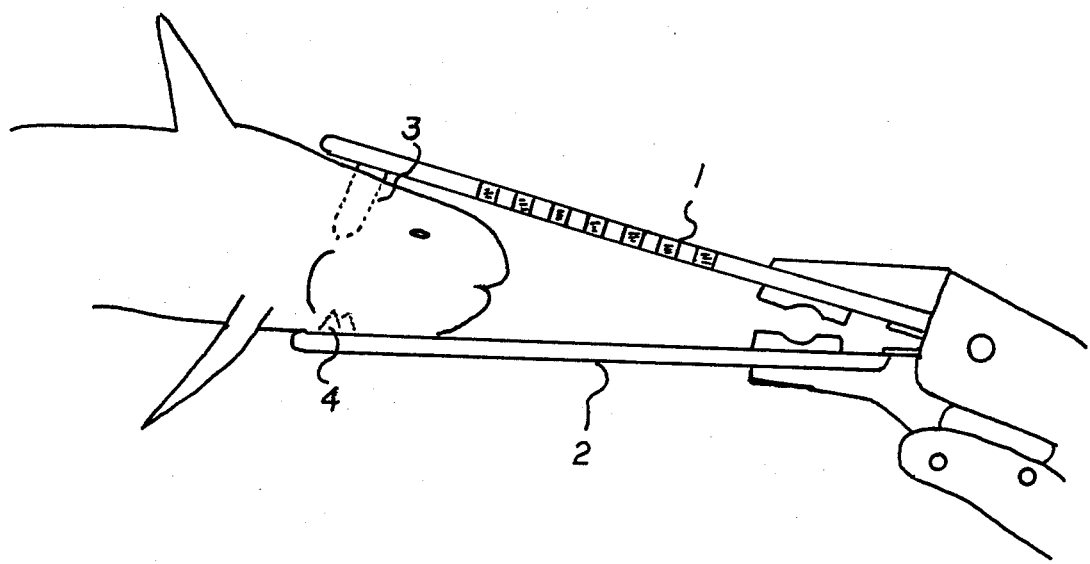
FIG. 4 is a cross-sectional perspective view of the sportsman multiple use tool in use when used by a fisherman in grasping a fish.

As shown in FIG. 4, when the embodiment is in use as a fish handler or grasper, the teeth, parts 3 and 4, penetrate the fish thus preventing slipping, and the bill, part 1 and 2, can lock into place thus allowing the sportsman to manipulate the fish safely.

We claim:

1. A sportsman's multiple use locking plier type gripping tool comprising in combination;
   (a) a first flexible elongated tool bill having gripping teeth, with strength and the flexibility to deflect from its normal position, on the elongated side edge, serrations, and on the front free end of the bill an elongated V groove;
   (b) a second flexible elongated tool bill also having gripping teeth with strength and the flexibility to deflect from its normal position;
   (c) a means interconnecting said first and second elongated tool bills so that said first and second bills are swingable with respect to one another between a spaced apart condition and an apposed condition, in which the bill's gripping teeth are in a contracted relationship with one another, with the free ends of said bills defining one end of said gripping tool;
   (d) a single rigidly secured elongated vertical gripping tooth on the first of the said bills, the tooth being located in the center front inside of the free end of said bill;
   (e) a pair of rigidly secured elongated vertical teeth on the second of the said bills, the teeth being located in the front inside of the free end of said bill;
   (f) a spacer having been rigidly secured to each of the said bills, being located on the inside of said bills next to the connected pivoting base of said bills.

2. A sportsman's multiple-use locking plier type gripping tool as described in claim 1 wherein:
   (a) said teeth on the second bill are symmetrically disposed to either side of a common plane, said teeth being of a length such that when said bills are closed, they grip securely, also said teeth are tapered to a 45 degree angle at the tip, insuring a positive gripping and releasing action;
   (b) said tooth on the first bill is symmetrically disposed to either side of the common plane, said tooth tapering to a 45 degree angle at the tip, being of a substantially greater length than the length of said teeth members on the said second bill, said tooth member being of a length such that when the bill members are closed the tooth touches the opposed bill member, keeping the teeth on the said second bill from contacting the opposed first bill member.

3. A sportsman's multiple-use locking plier type gripping tool as described in claim 2 wherein:

(a) a platen spacer is rigidly secured to the inside of each said bill members, being symmetrically disposed to either side of said bills near the enclosed pivoting base, thus limiting the degree of motion of the bill members to a closed position;

(b) said platen spacer members will have a concave indention symmetrically disposed to either side of the said platens, thus upon being in an apposed condition in which the spacer members are in a contracted relationship with one another, a fish lead crimping device is formed allowing the lead to be crimped, but not cut.

4. A sportsman's multiple-use locking plier type gripping tool as described in claim 3 wherein a series of serrations are located on the first said bill member, being a selected distance apart on the elongated side edge, therein forming a scaling or scraping device.

5. A sportsman's multiple-use locking plier type gripping tool as described in claim 4 wherein an elongated V groove is symmetrically disposed to either side of the free end edge of the first said bill member, thus allowing hooks to be pushed for removal from a fish in any said direction when the said bill members are in an open or in an apposed position.

* * * * *